US010087957B2

(12) United States Patent
Jorgensen

(10) Patent No.: US 10,087,957 B2
(45) Date of Patent: Oct. 2, 2018

(54) HYDRAULIC SYSTEM

(71) Applicant: Danfoss Power Solutions ApS, Nordborg (DK)

(72) Inventor: Martin Raadkjaer Jorgensen, Soenderborg (DK)

(73) Assignee: Danfoss Power Solutions ApS, Nordborg (DE)

( * ) Notice: Subject to any disclaimer, the term of this patent is extended or adjusted under 35 U.S.C. 154(b) by 53 days.

(21) Appl. No.: 14/865,673

(22) Filed: Sep. 25, 2015

(65) Prior Publication Data

US 2016/0090999 A1 Mar. 31, 2016

(30) Foreign Application Priority Data

Sep. 30, 2014 (EP) .................................... 14186984

(51) Int. Cl.

| | |
|---|---|
| ***F16D 31/02*** | (2006.01) |
| ***F15B 11/10*** | (2006.01) |
| ***F15B 13/02*** | (2006.01) |
| ***F15B 11/032*** | (2006.01) |
| *F15B 13/08* | (2006.01) |

(52) U.S. Cl.

CPC ............ *F15B 11/10* (2013.01); *F15B 11/032* (2013.01); *F15B 13/02* (2013.01); *F15B 13/0892* (2013.01); *F15B 13/0839* (2013.01)

(58) Field of Classification Search

CPC ........ F16B 11/10; F16B 11/032; F16B 13/02; F16B 13/0892; F16B 13/0839

USPC ............................................................ 60/560

See application file for complete search history.

(56) References Cited

U.S. PATENT DOCUMENTS 3,589,387 A * 6/1971 Raymond ........... F15B 13/0817 137/261

7,726,950 B2 * 6/2010 Hansen .................. F04B 9/107 417/225

(Continued)

FOREIGN PATENT DOCUMENTS

CN 101457775 A 6/2009

CN 101498324 A 8/2009

(Continued)

OTHER PUBLICATIONS

Espacenet Machine Translation of DE 10 2009 035278 (A1).*

European Search Report for European Application No. EP14186984 dated Apr. 14, 2015.

*Primary Examiner* — Thomas E Lazo

*Assistant Examiner* — Daniel Collins

(74) *Attorney, Agent, or Firm* — McCormick, Paulding & Huber LLP

(57) ABSTRACT

A hydraulic system (1) is disclosed comprising a pressure source (2), at least a hydraulic consumer (12, 13), and a pressure booster (16) arranged between the pressure source (2) and the hydraulic consumer (12, 13), wherein inactivating means (17) are provided inactivating or activating said pressure booster (16), said pressure booster (16) and said inactivating means (17) being part of a booster module (11). The operational possibilities of such a hydraulic system (1) should be extended. To this end the booster module (11) is part of a valve block (3), said valve block (3) comprising said booster module (11) and at least one valve module (9, 10) controlling said hydraulic consumer (12, 13).

17 Claims, 2 Drawing Sheets

(56) References Cited

U.S. PATENT DOCUMENTS

| | | | | |
|---|---|---|---|---|
| 2005/0178121 A1* | 8/2005 | Hansen | B23D 29/02 | 60/560 |
| 2006/0213363 A1* | 9/2006 | Dettmers | E21D 23/16 | 91/418 |
| 2014/0283512 A1* | 9/2014 | Buhl | F15B 15/02 | 60/533 |

FOREIGN PATENT DOCUMENTS

| | | | |
|---|---|---|---|
| CN | 100564901 | C | 12/2009 |
| DE | 10 2009 035 278 | A1 | 2/2011 |
| DK | 2005 00218 | A | 8/2005 |
| EP | 2784331 | A1 | 1/2014 |

* cited by examiner

HYDRAULIC SYSTEM

CROSS REFERENCE TO RELATED APPLICATION

Applicant hereby claims foreign priority benefits under U.S.C. § 119 from European Patent Application No. EP 14186984 filed on Sep. 30, 2014, the contents of which are incorporated by reference herein.

TECHNICAL FIELD

The present invention relates to a hydraulic system comprising a pressure source, at least a hydraulic consumer and a pressure booster arranged between the pressure source and the hydraulic consumer, wherein inactivating means are provided inactivating or activating said pressure booster, said pressure booster and said inactivating means being parts of a booster module.

BACKGROUND

Such a hydraulic system is known, for example, from EP 2 784 331 A1 (prior art according to article 54(3) EPC).

The pressure source, e.g. a hydraulic pump, supplies hydraulic fluid under an elevated pressure. The hydraulic consumer can be operated by means of this elevated hydraulic pressure.

In some applications the pressure supplied by the pressure source is not sufficient to operate the hydraulic consumer so that a pressure booster is used to permanently amplify the pressure supplied by the pressure source. The pressure booster is a pressure amplifier increasing the pressure supplied to the consumer.

SUMMARY

The object underlying the invention is to extent the operational possibilities of a hydraulic system.

This object is solved with a hydraulic system as described at the outset in that said booster module is part of a valve block, said valve block comprising said booster module and at least one valve module controlling said hydraulic consumer.

When the booster module is part of the valve block, there is no need for additional piping connecting the valve module and the booster module. The combination of the valve module and the booster module allows for a simple construction. The valve block can be dimensioned with sufficient strength to withstand the higher pressure delivered by the booster module. Since the pressure booster can be activated or inactivated, the system can be operated with the pressure supplied by the pressure source alone, if this pressure is sufficient to operate the hydraulic consumer, or it can be operated using the pressure booster, i.e. the pressure intensifier, to supply an elevated pressure to the consumer. In such a system the pressure booster or pressure intensifier is activated only when required, i.e. the pressure booster is not "active" during normal operations. In this way it is possible to select a lower pressure or a higher pressure simply by using the inactivating means. In other words, the system is able to supply "pressure on demand".

In a preferred embodiment said valve block comprises an inlet module and an end module, said booster module being arranged between said inlet module and said end module, wherein a pressure line connecting said inlet module and said end module runs through said booster module. In this way it is possible to use the pressure line for two purposes. One purpose is to be a pressure source for the inlet of the pressure booster. The other purpose is to receive the elevated pressure from the high pressure output of the pressure booster. The only requirement is that in this case a check valve (or any other means for controlling pressure differences) is arranged within the pressure line in the booster module. Such a check valve is allowed since the closing direction in the pressure line is clearly defined.

In a preferred embodiment said booster module is positioned between two valve modules. In this case the valve module located upstream the booster module with respect to the pressure source is supplied with pressure from the pressure source only. The valve module (or the valve modules) located downstream the booster module with respect to the pressure source can be supplied with higher pressure from the pressure booster, if necessary. Usually the pressure demand of the hydraulic consumers connected to the respective valve modules is known. By arranging the valve modules and the booster module a preselection can be made so that only part of the valve modules and consequently part of the hydraulic consumers can be supplied with the higher pressure of the pressure booster. This is an energy saving construction since higher pressure is delivered only to part of the system.

Preferably said pressure booster is a hydraulic pressure booster. In a simple embodiment such a hydraulic pressure booster can be realized by using a differential piston having a larger face which is loaded by the pressure of the pressure source and an opposite smaller face generating the higher pressure. The ratio between the two faces basically determines the application factor of the hydraulic pressure booster.

Preferably said inactivating means are hydraulic means. This is a rather simple way to realize the inactivating means, since in a hydraulic system it is possible to use hydraulic means without increasing dramatically the construction or maintenance costs.

In a preferred embodiment said inactivating means are at least in part arranged in series with said pressure booster. In this way, supply of hydraulic fluid to said pressure booster can be interrupted.

Preferably said inactivating means are hydraulically operated. In a hydraulic system hydraulic pressures are available which can be controlled to operate the inactivating means.

Preferably said inactivating means comprise an inactivating valve located between said pressure line and said pressure booster, said inactivating valve interrupting, in a closed state, a connection between said pressure line and said pressure booster. When the inactivating valve is closed, there is no supply of hydraulic fluid from the pressure line to the pressure booster so that the pressure booster is not able to output any hydraulic fluid and consequently is not able to output any hydraulic fluid under a higher pressure. On the other hand, when the inactivating valve is opened, hydraulic fluid from the pressure line can reach the low pressure inlet of the pressure booster which can in turn operate to increase the pressure of the hydraulic fluid over the pressure in the pressure line.

In a preferred embodiment said inactivating valve is loaded in opening direction by a pressure in said pressure line and in closing direction by a force of spring means. In this case the inactivating valve is opened, when the pressure in the pressure line increases. This can be, for example the case when the pressure source increases the pressure as response of a pressure demand signal by a LS pressure, i.e. a load sensing pressure. In this case the inactivating valve is opened so that the pressure booster receives with hydraulic fluid the pressure of which can be further increased. In this way the output pressure of the pressure source can be reduced.

In another preferred embodiment said inactivating valve is loaded in opening direction by a pressure depending on a pressure in a load sensing line and in closing direction by a force of spring means. The load sensing line usually signals a pressure demand of a consumer. In this case the pressure booster can be activated depending on the pressure required, for example a load sensing pressure. When the pressure at the load dependent position signals that a higher pressure is required to operate the hydraulic consumer, for example to lift a heavy load, this pressure demand can automatically be transmitted to said inactivating valve, said inactivating valve is opening and activating said pressure booster. In this case no action of the operator is required. However, the hydraulic system can be used in an energy saving manner when the pressure booster is inactive, or in a powerful operation, when the pressure booster is used to generate a higher pressure. However, the last named operation is performed only when necessary.

In a third preferred embodiment said inactivating valve is loaded in opening direction by a pressure in a pilot pressure line and in closing direction by a force of spring means. The pilot pressure line has a pressure which is sufficient to operate some valves. In this case the spring means can be designed with a lower spring force.

Preferably an electrically operated valve is arranged between said pilot pressure line and said inactivating means. In some cases it is easier to use an electric signal line. The inactivating means are operated via an electrically operated valve which could be a magnetic or a solenoid valve which is operated by an electric current. There are some possibilities to operate the inactivating means. A first possibility is to use an electric switch, which can, for example, be positioned at a joystick with which the operator controls the function of a hydraulic consumer downstream said booster module. Another possibility would be to connect the signal line to a sensor sensing a pressure demand at the hydraulic consumer.

In a preferred embodiment said inactivating valve is loaded in closing direction by a pressure in an auxiliary line connected to a tank line via throttling means, wherein a pressure relief valve is connected to said auxiliary line between said inactivating valve and said throttling means, an inlet of said pressure relief valve being connected to a high pressure output of said pressure booster. In this way the inactivating valve can be closed as soon as the pressure at the high pressure output of the pressure booster together with the force of the spring means exceeds the force on the opposite site of the inactivating valve. The inactivating valve is automatically closed as soon as the pressure delivered by the pressure booster exceeds a pre-determined threshold value defined by the relief valve.

BRIEF DESCRIPTION OF THE DRAWINGS

Preferred embodiments of the invention now are described in more detail with reference to the drawing, wherein.

DETAILED DESCRIPTION

Figure 1:
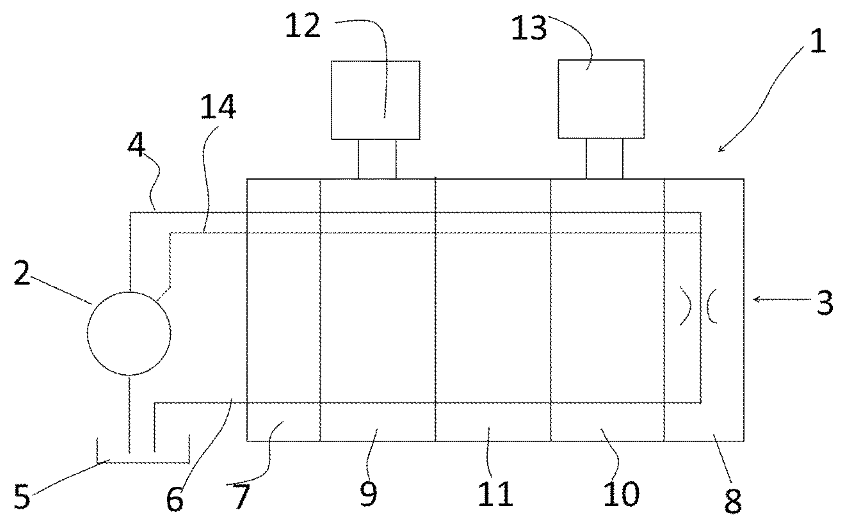
FIG. 1 shows a schematic illustration of a valve block.

In all figures the same elements are designated with the same reference numerals.

FIG. 1 schematically shows a hydraulic system 1 having a pressure source 2, for example a pump, and a valve block 3. The pressure source 2 supplies hydraulic fluid with an elevated pressure to a pressure line 4 of the valve block 3. The hydraulic fluid is taken from a tank 5. A tank line 6 of the valve block 3 returns hydraulic fluid to the tank 5.

The valve block 3 comprises an inlet module 7 and an end module 8. Two valve modules 9, 10 are arranged between the inlet module 7 and the end module 8. Furthermore, a booster module 11 is arranged between the two valve modules 9, 10. The booster module 11 will be described below with more details.

The pressure line 4 and the tank line 6 each connect the inlet module 7 and the end module 8, as it is known in the art. The pressure line 4 and the tank line 6 extend through the valve modules 9, 10 and through the booster module 11.

A hydraulic consumer 12 is connected to the valve module 9 and a hydraulic consumer 13 is connected to a valve module 10. The hydraulic consumers 12, 13 can be, for example, a hydraulic cylinder or a hydraulic rotational motor.

As it is known, all modules 7-11 together form a stack of modules, i.e. they contact each other and can be held together by clamping means, such as bolts or the like.

Furthermore, a load sensing line 14 is guided through the valve block 3 and signals a load sensing pressure to the pressure source 2.

A pilot pressure line 15 is guided through the valve block 3 as well. However, this pilot pressure line 15 is not shown in FIG. 1, but in FIGS. 2 to 4 only.

Figure 2:
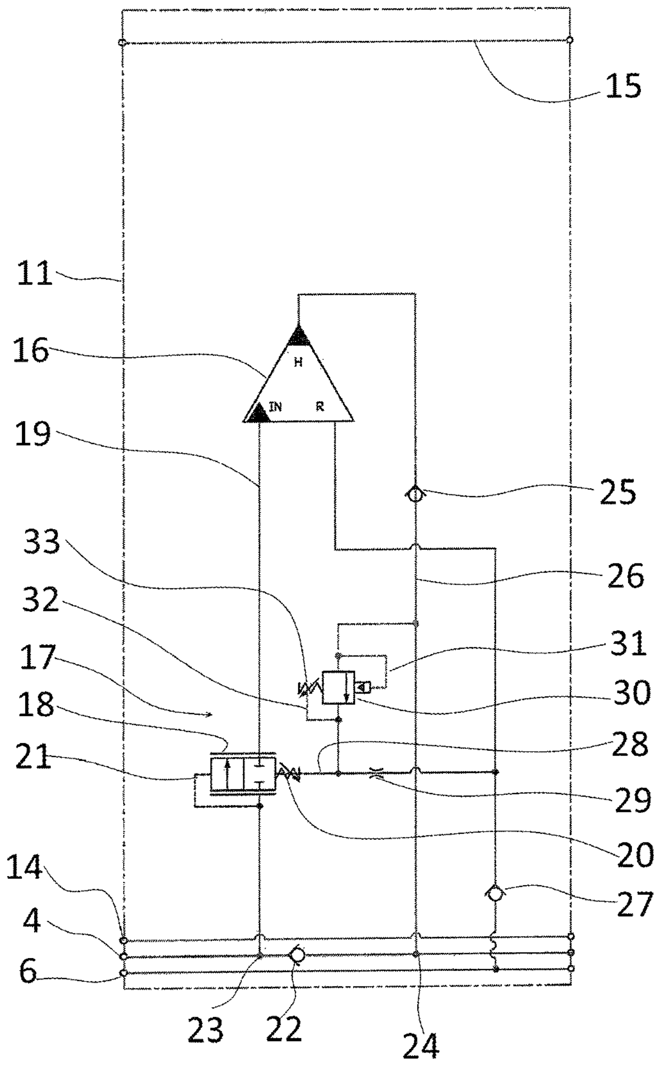
FIG. 2 shows a first embodiment of a pressure booster module.
Figure 4:
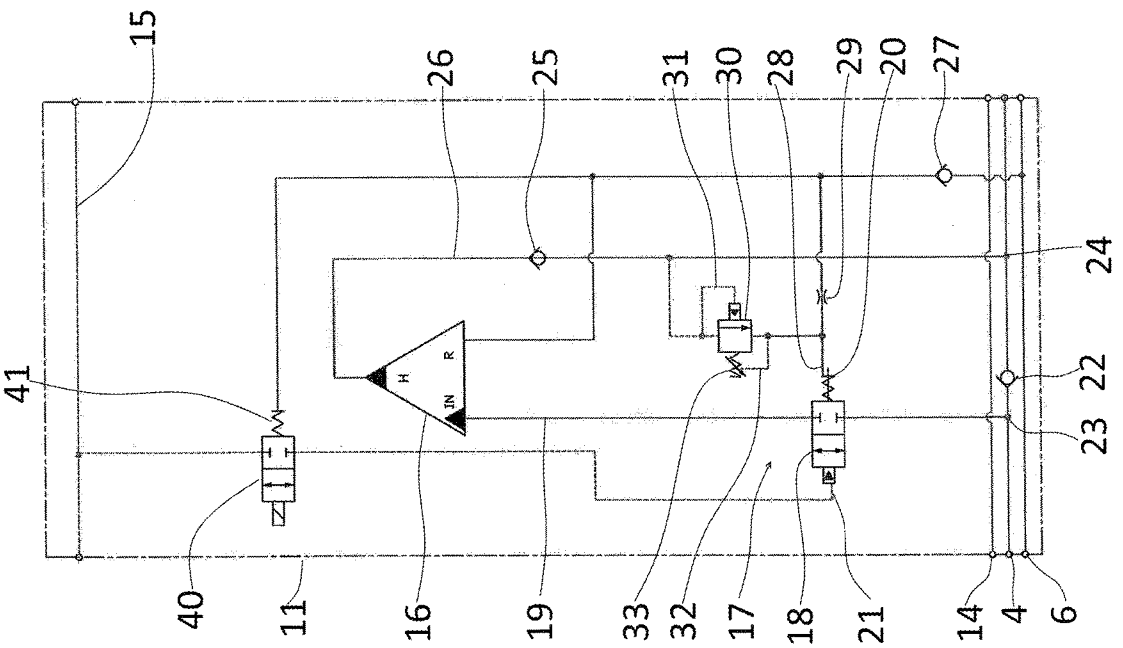
FIG. 4 shows a third embodiment of a pressure booster module.
Figure 3:
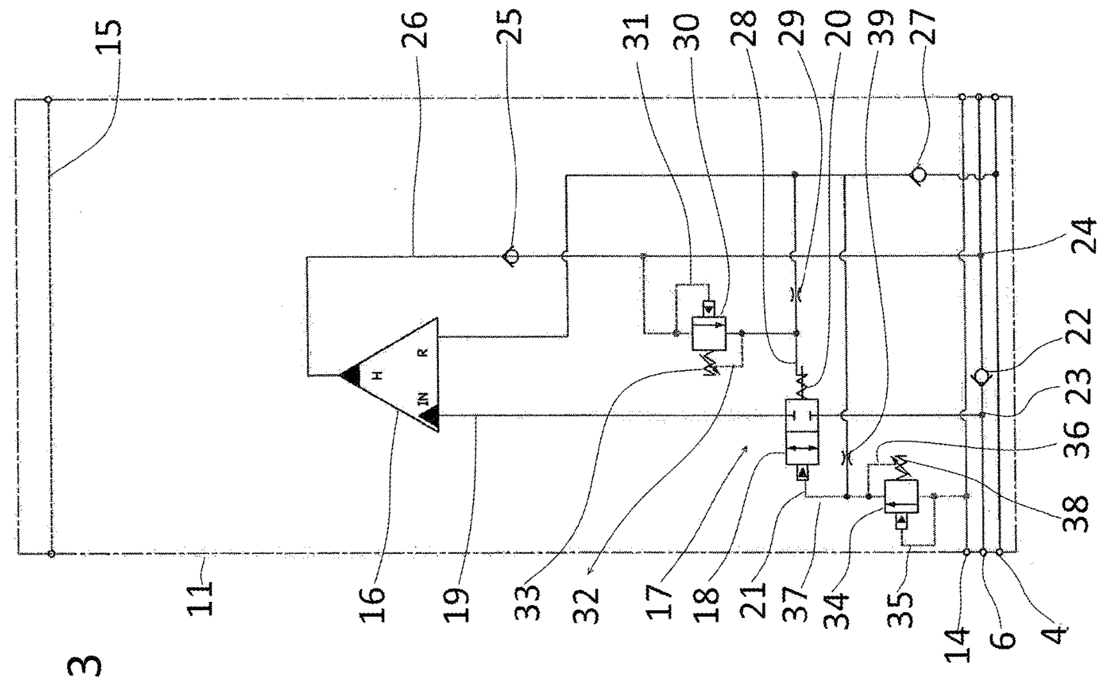
FIG. 3 shows a second embodiment of a pressure booster module.

FIGS. 2 to 4 show different embodiments of the booster module 11. The booster module 11 comprises a hydraulic pressure booster 16 or pressure amplifier. The pressure booster 16 has a low pressure input IN, a high pressure output H, and a return port R. Such a pressure booster is disclosed, for example, in U.S. Pat. No. 7,726,950 B2. The disclosure of this document is incorporated by reference.

The pressure booster 16 in the booster module 11 is provided with inactivating means 17. The inactivating means 17 comprise an inactivating valve 18 arranged in a line 19 connecting the pressure line 4 and the input IN of the pressure booster 16, i.e. it is connected in series with the pressure booster 16.

The inactivating valve 18 is usually held in the closed state shown in FIG. 2 by the force of a spring 20. The inactivating valve 18 furthermore comprises a first control port 21. In the embodiment shown in FIG. 2 the first control port 21 is connected to the tank line 4 as well. When the force at the first control port 21 generated by the pressure in the pressure line 4 exceeds the force of the spring 20 the inactivating valve is opened. In this case the input IN of the pressure booster 16 is supplied with hydraulic fluid having the pressure of the pressure line 4. The pressure booster 16 increases this pressure and delivers hydraulic fluid under an elevated pressure to the pressure line 4.

A check valve 22 is located in the pressure line 4 between a point 23 connected to the inactivating valve 18 and a point 24 connected to the high pressure output H of the pressure booster 16.

A further check valve 25 is arranged in a line 26 between the high pressure output H of the pressure booster 16 and point 24 in the pressure line 4.

The return port R of the pressure booster 16 is connected to the tank line 6 via a check valve 27 opening in a direction towards the tank line 6.

The inactivating valve 18 may have a second control port 28 connected to the return port R of the pressure booster 16 via throttling means 29. The pressure at the second control port 28 acts in the same direction as spring 20.

A pressure relief valve 30 is connected between a point in line 26 downstream the check valve 25 and the second control port 28. The pressure relief valve 30 has a first pressure relief valve control port 31, a second pressure relief valve control port 32 and a closing spring 33. A pressure at the first pressure relief valve control port 31 generates a force on the pressure relief valve 30 acting in opening direction of the pressure relief valve 30. This first pressure relief valve control part 31 is connected to the line 26 downstream the check valve 25. The pressure at the second pressure relief valve control port 32 generates a force on the pressure relief valve 30 acting in closing direction. The closing spring 33 generates a force acting in closing direction as well. The second pressure relief valve control port 32 is connected to the second control port 28 of the inactivating valve 18.

When at the pressure relief valve 30 a force generated by the pressure at the high pressure output H of the pressure booster 16 exceeds the force of the closing spring 33 the pressure relief valve 30 opens and supplies the high pressure to the second control port 28 of the inactivating valve 18 thereby closing the inactivating valve 18 so that the supply of hydraulic fluid to the pressure booster 16 is interrupted.

Inactivating means 17 comprising the inactivating valve 18 and the pressure relief valve 30 form a closed loop control adjusting the increased pressure just to the level needed.

FIG. 3 shows a second embodiment of a booster module 11. Same elements as in FIG. 2 are designated with the same reference numerals.

The booster module 11 shown in FIG. 3 differs from that shown in FIG. 2 in that the inactivating valve 18 is differently controlled.

The inactivating valve 18 is located in the same line 19 between point 23 of the pressure line 4 and the input IN of the pressure booster 16.

However, the first control port 21 of the inactivating valve 18 is connected to the load sensing line 14 via a LS relief valve 34. A first control port 35 of the LS relief valve 34 is connected to the LS line 14 as well. The pressure at the first control port 35 acts in opening direction of the LS relief valve 34. A second control port 36 is connected to a line 37 connecting said LS relief valve 34 and the first control port 21 of the inactivating valve 18. A pressure at the second control port 36 acts in closing direction on the LS relief valve 34. Furthermore, a closing spring 38 acts in closing direction as well. Line 37 is connected to the tank line 6 via throttling means 39.

LS relief valve 34 opens when the pressure in the LS line 14 exceeds the force of closing spring 38. As soon as LS relief valve 34 is open, inactivating valve 18 is opened as well and the pressure booster 16 is supplied with hydraulic fluid the pressure of which is to be amplified.

The pressure relief valve 30 has the same function as in the embodiment shown in FIG. 2.

FIG. 4 shows a third embodiment of the booster module 11. Same elements as in FIGS. 3 and 4 are designated with the same numerals.

Activating of the inactivating valve 18 is made by operating an electrically operated valve 40 arranged between the first control port 21 of the inactivating valve 18 and the pilot pressure line 15. When the electrically operated valve 40 is open, the pressure in the pilot pressure line 15 acts in opening direction on the inactivating valve 18, thereby opening the inactivating valve 18.

The function of the pressure relief valve 30 is the same as in FIGS. 2 and 3.

The electrically operated valve 40 can be remotely controlled, for example by means of an electrical switch located in a driver's cabin of a vehicle. When the switch is closed the electrically operated valve 40 is supplied with current thereby opening. When the current is switched off, a closing spring 41 closes the electrically operated valve 40.

Since in the embodiments in FIGS. 2 to 4 different pressures are used to open the inactivating valve 18, the spring 20 in all embodiments may have different characteristics. For example, the spring 20 in the embodiment shown in FIG. 3 has to act against the pressure in the pressure line 4 whereas the spring in the embodiment shown in FIG. 3 has to act against a pressure at the outlet of the LS relief valve 34 and the spring 20 in the embodiment shown in FIG. 4 has to act against the pressure in the pilot pressure line 15 only. However, the dimensioning of the spring 20 belongs to the normal skill of an expert.

When the booster module 11 is positioned between two valve modules 9, 10, only the valve module 10 downstream the booster module 11 with respect to the pressure line 4 receives hydraulic fluid with a pressure higher than that delivered by the pressure source 2.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic system comprising:
- a pressure source,
- two hydraulic consumers, and
- a pressure booster arranged between the pressure source and at least one of the two hydraulic consumers,
- wherein inactivating means are provided for inactivating or activating said pressure booster, said pressure booster and said inactivating means being part of a booster module,
- wherein said booster module is part of a valve block, said valve block comprising said booster module and two valve modules, each of the two valve modules controlling a different one of the two hydraulic consumers,
- wherein said booster module is positioned between said two valve modules, and
- wherein each of the two hydraulic consumers is connected to a different one of the two valve modules.

2. The hydraulic system according to claim 1, wherein said valve block comprises an inlet module and an end module, said booster module being arranged between said inlet module and said end module, wherein a pressure line connecting said inlet module and said end module runs through said booster module.

3. The hydraulic system according to claim 2, wherein said pressure booster is a hydraulic pressure booster.

4. The hydraulic system according to claim 2, wherein said inactivating means are hydraulic means.

5. The hydraulic system according to claim 2, wherein said inactivating means are at least in part arranged in series with said pressure booster.

6. The hydraulic system according to claim 1, wherein said pressure booster is a hydraulic pressure booster.

7. The hydraulic system according to claim 6, wherein said inactivating means are hydraulic means.

8. The hydraulic system according to claim 1, wherein said inactivating means are hydraulic means.

9. The hydraulic system according to claim 1, wherein said inactivating means are at least in part arranged in series with said pressure booster.

10. The hydraulic system according to claim 9, wherein said inactivating means are hydraulically operated.

11. The hydraulic system according to claim 9, wherein said inactivating means comprise an inactivating valve located between said pressure line and said pressure booster, said inactivating valve interrupting, in a closed state, a connection between said pressure line and said pressure booster.

12. The hydraulic system according to claim 11, wherein said inactivating valve is loaded in an opening direction by a pressure in said pressure line and in a closing direction by a force of spring means.

13. The hydraulic system according to claim 11, wherein said inactivating valve is loaded in an opening direction by a pressure depending on a pressure in a load sensing line and in a closing direction by a force of spring means.

14. The hydraulic system according to claim 11, wherein said inactivating valve is loaded in an opening direction by a pressure in a pilot pressure line and in a closing direction by a force of spring means.

15. The hydraulic system according to claim 14, wherein an electrically operated valve is arranged between said pilot pressure line and said inactivating valve.

16. A hydraulic system comprising a pressure source, at least a hydraulic consumer, and a pressure booster arranged between the pressure source and the hydraulic consumer, wherein inactivating means are provided for inactivating or activating said pressure booster, said pressure booster and said inactivating means being part of a booster module, wherein said booster module is part of a valve block, said valve block comprising said booster module and at least one valve module controlling said hydraulic consumer, wherein said inactivating means are at least in part arranged in series with said pressure booster, wherein said inactivating means comprise an inactivating valve located between said pressure line and said pressure booster, said inactivating valve interrupting, in a closed state, a connection between said pressure line and said pressure booster, wherein said inactivating valve is loaded in an opening direction by a pressure in said pressure line and in a closing direction by a force of spring means, and wherein said inactivating valve is loaded in closing direction by a pressure in an auxiliary line connected to a tank line via throttling means, wherein a pressure relief valve is connected to said auxiliary line between said inactivating valve and said throttling means, an inlet of said pressure relief valve being connected to a high pressure output of said pressure booster.

17. A hydraulic system comprising:

a pressure source, a first hydraulic consumer, a second hydraulic consumer, and a pressure booster arranged between the pressure source and the first hydraulic consumer or the second hydraulic consumer, wherein inactivating means are provided for inactivating or activating said pressure booster, said pressure booster and said inactivating means being part of a booster module, wherein said booster module is part of a valve block, said valve block comprising said booster module, a first valve module and a second valve module, the first valve module controlling said first hydraulic consumer and the second valve module controlling said second hydraulic consumer, wherein said booster module is positioned between said first valve module and said second valve module, said first hydraulic consumer being connected to said first valve module and said second hydraulic consumer being connected to said first second valve module.

* * * * *